United States Patent Office 3,375,290
Patented Mar. 26, 1968

3,375,290
PROCESS FOR WORK-UP OF AROMATIC
C₉-HYDROCARBONS
Karl Smeykal, Wilhelm Pritzkow, Hermann G. Hauthal, and Georg Mahler, Leuna, Germany, assignors to VEB Leuna-Werke "Walter Ulbricht," Leuna, Germany
No Drawing. Filed Sept. 3, 1964, Ser. No. 394,303
9 Claims. (Cl. 260—672)

The present invention relates to a process for working up mixtures of aromatic $C_9$-hydrocarbons with simultaneous recovery of toluene, ethylbenzene and cumene.

Fractions of aromatic $C_9$-hydrocarbons which may be obtained from reformed gasoline by extraction and subsequent distillation, consist of a large number of components which are listed in the Table I hereinbelow.

TABLE I.—COMPOSITION OF TECHNICAL MIXTURES OF AROMATIC C₉-HYDROCARBONS

| Compound | B.P. at 760 mm., °C. | Contents in percent of individual aromatic C₉-hydrocarbons | | | |
|---|---|---|---|---|---|
| | | (1)(A) | (2)(A) | (3)(A) | (4)(A) |
| o-Xylene | 144.4 | 5.4 | 0.6 | 4.2 | |
| Cumene | 152.4 | 2.4 | 0.5 | | 1.75 |
| n-Propylbenzene | 159.2 | 7.1 | 6.2 | 9.6 | 6.75 |
| m-Ethyltoluene | 161.3 | 17.4 | 23.1 | 18.5 | 20.2 |
| p-Ethyltoluene | 162.0 | 8.9 | 13.4 | 8.9 | 8.1 |
| Mesitylene | 164.7 | 8.8 | 13.1 | 5.2 | 7.25 |
| O-Ethyltoluene | 165.2 | 8.1 | 12.2 | 11.2 | 6.75 |
| Pseudocumene | 169.4 | 22.8 | 30.9 | 26.7 | 27.3 |
| Isobutylbenzene | 172.8 | 0.2 | | | 0.75 |
| Sec.-butylbenzene | 173.3 | 0.1 | | | |
| m-Isopropyltoluene | 175.1 | 0.9 | | | ²3.0 |
| Hemimellitene | 176.1 | 6.2 | | ¹15.3 | 6.5 |
| p-Isopropyltoluene | 177.1 | 0.2 | | | |
| Indane | 177 | 1.4 | | | 3.1 |
| o-Isopropyltoluene | 178.2 | 0.1 | | | |

¹ Including Aromatics C¹⁰-hydrocarbons.
² Including p-Isopropyltoluene.
(A)—See Bibliography at end of specification.

From the mixtures of technical aromatic $C_9$-hydrocarbons one may, by further distillation, obtain fractions, in which only a few of the above listed compounds are contained, sometimes in mixture with aromatic $C_8$- or $C_{10}$-hydrocarbons. When producing technical o-xylene, one likewise obtains aromatic $C_9$-hydrocarbons mixtures which do not contain all the compounds listed in Table I.

Particularly interesting compounds from a technical point of view are the trimethylbenzenes: mesitylene, pseudocumene, and hemimellitene. The recovery of these compounds in pure state by distillation of aromatic $C_9$-hydrocarbons is made very difficult by the presence of ethyl toluenes and isopropyl toluenes.

It has now been found that mixtures of aromatic $C_9$-hydrocarbons can be worked up with simultaneous recovery of toluene, ethylbenzene, and cumene, and removal of undesirable ethyltoluenes and isopropyltoluenes, by treating the said mixtures with benzene in the presence of a Friedel-Crafts catalyst and subjecting the reaction product to fractional distillation after having eliminated the catalyst.

The reaction leads to the following equilibria:

ethyltoluene+benzene⇌toluene+ethylbenzene
isopropyltoluene+benzene⇌toluene+cumene Therefore, one obtains from the compounds which are undesirable in the mixture of aromatic $C_9$-hydrocarbons as valuable and easily separable products toluene, ethylbenzene and cumene. From the reaction mixture the principal amount of the catalyst is removed by allowing it to settle at the bottom and the remainder by washing it out with water. In the fractional distillation forming the last operation, the recovery of the pure compounds from the mixture is easily accomplished.

In order to increase the rate of reaction, it is possible to add to the mixture as co-catalyst an anhydrous hydrogen halide or a compound which will form hydrogen halide under the conditions of the reaction. As compounds, which form hydrogen halides under the conditions of the reaction, alkyl halides, water, alcohols or carboxylic acid derivates may be used.

For carrying out the process according to the invention, aromatic $C_9$-hydrocarbons are subjected to the treatment at temperatures ranging from 0°–150° C., preferably from 40° C. to 85° C. The reaction times required depend on the chosen temperatures and on the type and amount of the catalyst used. As a general rule, they lie between 3 and 300 minutes, preferably between 180 and 240 minutes. The mean reaction time is from 10 to 100 minutes.

The Friedel-Crafts catalyst is preferably used in amounts of 2 to 15 weight percent, calculated on the aromatic $C_9$-hydrocarbons mixture. Aluminum chloride is particularly suitable. Another good catalyst is boron trifluoride, especially in combination with hydrogen fluoride. When using this catalyst system, the work-up is simplified by the fact that both catalyst components can be removed in vapor form at temperatures above 30° C. or by applying a vacuum.

If, as co-catalysts, hydrogen chloride or bromide are used, these may be applied in quantities of up to 1 mol per 1 mol Friedel-Crafts catalyst. When boron trifluoride is used as a catalyst, there is theoretically no limitation to the hydrogen fluoride used as co-catalyst, since hydrogen fluoride forms a liquid phase of its own at temperatures below 20° C. or with the use of superatmospheric pressure.

The amount of benzene which is preferably added to the aromatic $C_9$-hydrocarbon mixture may be calculated from the equilibrium constants determined by ourselves, of the following reactions ethyltoluene+benzene⇌toluene+ethylbenzene
(K=2.2)
isopropyltoluene+benzene⇌toluene+cumene
(K=2.1)

which are practically independent of the temperature. In general, the ratio by weight of the aromatic $C_9$-hydrocarbon mixture: benzene will vary between 1:0.5 and 1:10.

The process according to the invention for the work-up of the aromatic $C_9$-hydrocarbon mixtures may be effected continuously or discontinuously. When working continuously we recommend the use of a reactor cascade having three to five units, in order to keep the deviations in time of stay at a low degree thereby avoiding an undesirable trans-alkylation of trimethylbenzenes.

In the following, the invention will be more fully explained in a number of examples, but it should be understood that these are given by way of illustration and not of limitation and that many changes in the details may be made without departing from the spirit of the invention.

Example 1

Into a three-neck flask of 250 cc. capacity, equipped with stirrer, reflux cooler, and thermometer, an aromatic hydrocarbon mixture is introduced which consists of 30 g. m/p-ethylotoluene and 30 g. mesitylene, to which are added 88 g. benzene. The temperature of the flask contents is brought up to 85° C. in a heating bath provided with a thermostat. Subsequently, we add 7.5 g. anhydrous aluminum chloride and allow the reaction to proceed at 85° C. while stirring thoroughly. From time to time, test specimens are taken from the reaction mixture in the amount of about 5 cc. Immediately after taking out the specimens, they are treated as follows:

The specimen is shaken out with the double amount of distilled water, dried over potassium carbonate, and filtered. Thereafter, the specimens are analyzed by the gas-chromatographic method for their contents. The change which the mixture of aromatic hydrocarbons undergoes during the experiment can be seen from Table II, the figures relating to mol percent.

TABLE II.—TRANSALKYLATION OF AROMATIC C₉-HYDROCARBONS WITH BENZENE

| Reaction time in minutes | Benzene | Toluene | Ethylbenzene | m/p-Xylene | o-Xylene | m/p-Ethyl toluene | Mesitylene | Pseudocumene |
|---|---|---|---|---|---|---|---|---|
| 0 | 69.0 | | | | | 15.5 | 15.5 | |
| 5 | 68.4 | 0.5 | 0.6 | | | 15.1 | 15.4 | |
| 10 | 67.4 | 1.6 | 1.5 | | | 13.5 | 16.0 | |
| 15 | 66.7 | 2.7 | 2.5 | | | 11.6 | 16.5 | |
| 20 | 65.4 | 3.5 | 3.4 | | | 11.5 | 16.2 | |
| 30 | 62.2 | 6.4 | 6.2 | 0.2 | | 9.2 | 15.8 | |
| 45 | 60.8 | 8.1 | 7.9 | 0.2 | | 7.5 | 15.5 | |
| 60 | 57.0 | 11.2 | 10.9 | 0.3 | | 5.5 | 15.1 | |
| 90 | 56.0 | 12.6 | 12.2 | 0.4 | | 3.5 | 15.3 | |
| 120 | 55.6 | 13.1 | 13.1 | 0.6 | 0.1 | 2.5 | 13.5 | 1.5 |
| 180 | 54.8 | 14.0 | 13.8 | 0.8 | 0.1 | 1.5 | 11.8 | 3.2 |
| 240 | 54.4 | 13.8 | 13.8 | 1.0 | 0.2 | 1.5 | 11.1 | 4.2 |

Example 2

Into a stirring vessel enameled on the inside having 250 liter capacity, we introduce 30 kg. m/p-ethyltoluene and 30 kg. pseudo-cumene and add 88 kg. benzene. After heating to 85° C., 7 kg. anhydrous aluminum bromide are added to the mixture.

After a reaction time of 180 minutes, the mixture has the following composition:

| | Mol percent |
|---|---|
| Benzene | 54.1 |
| Toluene | 14.2 |
| Ethylbenzene | 14.0 |
| m/p-Xylene | 1.0 |
| o-Xylene | 0.2 |
| Ethyltoluene | 1.5 |
| Mesitylene | 4.2 |
| Pseudocumene | 10.8 |

The catalyst is decomposed by addition of 50 liter water, the aqueous phases separated, and the organic phase mixed by stirring with 20 kg. finely powdered calcium oxide at 40° C. for one hour. After the mixture has been allowed to settle with deposit of the solid ingredients, the liquid is transferred by means of a pump to a distillation apparatus. By distillation, we obtain.

| | Kg. |
|---|---|
| Benzene | 69 |
| Toluene | 21 |
| Ethylbenzene, 93% | 26 |
| 75% mesitylene fraction | 11 |
| Pseudo-cumene, higher than 98% | 21 |

Example 3

Into a three-neck flask of 250 cc. capacity, equipped with stirrer, reflux cooler, thermometer, and gas admission tube, 80 g. benzene and 19 g. anhydrous aluminum chloride are introduced. The mixture is saturated with dry hydrogen chloride, heated to 80° C. and added thereto are 90 g. of a aromatic C₉-hydrocarbon mixture of 80° C. having the following composition:

| | Percent |
|---|---|
| o-Xylene | 0.5 |
| Cumene | 3.5 |
| n-Propylbenzene | 6.0 |
| m/p-Ethyltoluene | 24.0 |
| o-Ethyltoluene | 6 |
| Mesitylene | 14 |
| Pseudocumene | 39 |
| and Hemimellitene | 6.5 |

The mixture is allowed to react with thorough stirring at 80° C. From time to time, specimens for analysis are taken out of the mixture, amounting to about 5 cc. each, which are worked up and analyzed as described in Example 1. The change of the composition of the mixture of aromatic hydrocarbons can be seen from Table III where the figures given refer to mol percent.

Example 4

Into a three-neck flask of 10 liter capacity provided with stirrer, reflux cooler and thermometer, we introduce 2,340 g. benzene, 220 g. anhydrous aluminum chloride and 2,000 g. of a fraction of aromatic C₉-hydrocarbons having the following composition:

| | Percent |
|---|---|
| Cumene | 3 |
| n-Propylbenzene | 20 |
| m/P-ethyltoluene | 46 |
| o-ethyltoluene | 8 |
| Mesitylene | 6 |
| Pseudocumene | 16 |
| Hemimellitne | 1 |

The mixture is thoroughly stirred for 180 minutes at 85° C. After termination of the reaction, the lower phase (545 g.) is separated from the mixture, said phase consisting of an addition compound of aluminm chloride and aromatic hydrocarbons. The addition compound can be used as catalyst for further reaction. The upper phase is shaken out with 2 liter water, 2 liter 5% aqueous sodium hydroxide solution, and again with the same amount of water, and is dried over sodium sulfate. The purified mixture (4,060 g.) is distilled over a jacketed vacuum column of 1 m. length, filled with wire spirals of 2 x 2 mm., the reflux ratio being 20:1. We obtain the following fractions:

| | G. |
|---|---|
| Benzene | 1,795 |
| Toluene | 655 |
| Ethylbenzene | 735 |
| Cumene | 60 |
| n-Propylbenzene | 390 |
| 94.8% trimethylbenzene | 410 |

TABLE III.—TRANSALKYLATION OF AROMATIC C₉-HYDROCARBONS WITH BENZENE

| Reaction time in minutes | Benzene | Toluene | Ethyl-benzene | m/p-Xylene | o-Xylene | Cumene | n-Propyl-benzene | m/p-Ethyl-toluene | o-Ethyl-toluene | Mesity-lene | Pseudo-documene | Hemi-mellitene |
|---|---|---|---|---|---|---|---|---|---|---|---|---|
| 0 | 58.0 | | | | 0.2 | 1.5 | 2.5 | 10.0 | 2.5 | 6.0 | 16.5 | 2.8 |
| 5 | 56.4 | 1.5 | 1.4 | | 0.2 | 1.5 | 2.5 | 8.7 | 2.3 | 6.0 | 16.5 | 3.0 |
| 10 | 55.4 | 3.2 | 3.0 | | 0.2 | 1.5 | 2.5 | 7.2 | 2.0 | 6.5 | 16.0 | 2.5 |
| 15 | 51.6 | 6.2 | 6.0 | | 0.2 | 1.5 | 2.5 | 5.0 | 1.5 | 6.7 | 16.0 | 2.8 |
| 20 | 50.5 | 7.0 | 7.0 | 0.1 | 0.2 | 1.5 | 2.5 | 4.7 | 1.4 | 6.8 | 15.8 | 2.5 |
| 30 | 49.6 | 9.0 | 8.8 | 0.2 | 0.1 | 1.5 | 2.5 | 2.5 | 0.8 | 7.0 | 15.5 | 2.5 |
| 45 | 49.2 | 9.5 | 9.5 | 0.2 | 0.1 | 1.5 | 2.5 | 1.7 | 0.5 | 7.0 | 15.8 | 2.5 |
| 60 | 48.7 | 10.5 | 10.3 | 0.2 | 0.1 | 1.5 | 2.5 | 1.0 | 0.2 | 7.2 | 15.5 | 2.3 |
| 75 | 48.6 | 10.4 | 10.4 | 0.3 | 0.1 | 1.5 | 2.5 | 1.0 | 0.2 | 7.0 | 15.5 | 2.5 |
| 90 | 48.9 | 10.2 | 10.4 | 0.4 | 0.1 | 1.5 | 2.5 | 1.0 | 0.2 | 7.0 | 15.3 | 2.5 |
| 120 | 48.5 | 10.1 | 10.4 | 0.6 | 0.1 | 1.5 | 2.5 | 1.0 | 0.3 | 6.8 | 15.5 | 2.7 |

Example 5

Into a stirrer-equipped autoclave with 2 liters capacity, we introduce 420 g. benzene, 360 g. of a mixture of aromatic $C_9$-hydrocarbons of the following composition:

| | Percent |
|---|---|
| Cumene | 3 |
| n-Propylbenzene | 20 |
| Ethyltoluene | 54 |
| Mesitylene | 6 |
| Pseudocumene | 16 |
| Hemimellitene | 1 | furthermore, 360 g. anhydrous hydrogen fluoride and 36 g. boron trifluoride. The mixture is heated up to 40° C., and the products are allowed to react together for 2 hours. Thereupon pressure is released from the autoclave, whereby hydrogen fluoride and boron trifluoride escape in gas form. Both products are received in a cooling device. For the complete removal of hydrogen fluoride and boron trifluoride, a weak current of nitrogen is bubbled for 1 hour through the reaction mixture. The autoclave is then cooled and emptied. The reaction mixture is subjected to fractional distillation, and the following fractions are received:

| | G. |
|---|---|
| Benzene | 320 |
| Toluene | 125 |
| Ethylbenzene | 140 |
| Cumene | 15 |
| n-Propylbenzene | 75 |
| 96% trimethylbenzene | 80 |

Example 6

Transalkylation is carried out in a cascade reactor which comprises three glass tubes, 40 cm. each in length, having a diameter of 6 cm. The bottom end of the first reaction tube is connected to a dosing pump. In the upper portion, a discharge for the reaction product is provided which is connected to the bottom end of the second tube. In the same manner, the second and third tubes are connected. The product leaves the apparatus at the upper end of the third tube. The connection tubes between the several cascade tubes are so arranged that the latter always contains one liter of the reaction product. The entire apparatus is placed in a bath heated to 80° C.

By adding 150 g. anhydrous aluminum chloride to 300 g. of the heated mixture of aromatic $C_9$-hydrocarbons, a catalyst mixture is produced of which one third each is added to the several reaction tubes. Thereafter, one liter per hour of a mixture containing equal parts by weight of a aromatic $C_9$-hydrocarbons fraction and of benzene is pumped into the reactor cascade by means of the dosing pump; the aromatic hydrocarbons fraction has the following composition:

| | Percent |
|---|---|
| Cumene | 3 |
| n-Propylbenzene | 20 |
| m/P-ethyltoluene | 46 |
| o-Ethyltoluene | 8 |
| Mesitylene | 6 |
| Pseudocumene | 16 |
| Hemimellitene | 1 |

The product leaving the reaction cascade is washed with an equal amount of water by volume, 5% aqueous sodium hydroxide solution, and again with water, and then dried over calcium chloride. 20 kg. of the purified product are distilled in a column having 30 theoretical plates and a capacity of 40 liters. The following fractions are obtained:

| | G. |
|---|---|
| Benzene | 6,570 |
| Toluene | 4,020 |
| Ethylbenzene | 4,455 |
| Cumene | 295 |
| n-Propylbenzene | 2,050 |
| 95.5% trimethylbenzene | 2,400 | the trimethylbenzene contains 35.5% mesitylene, 50% pseudocumene and 10% hemimellitene.

BIBLIOGRAPHY (1) R. B. Williams, S. H. Hastings u. J. A. Anderson Jr., Analytic, Chem. 24, 1916 (1952).
(2) Ja. I. Lejtman, I. N. Dijarov u. M. S. Pevzner, Neftekhimia (russ.) 2, 242 (1962).
(3) K. H. Wingerter, Chem. Techn. 14, 333 (1962).
(4) K. Smeykal, H. G. Hauthal, W. Engler, Chem. Techn. 14, 732 (1962).

What we claim is:
1. Method of recovering trimethylbenzene from a mixture of aromatic $C_9$-hydrocarbons containing the same and also containing at least one substance selected from the group consisting of ethyltoluene and isopropyltoluene, which comprises reacting said mixture with benzene in contact with a Friedel-Crafts catalyst so as to selectively transfer the corresponding ethyl or isopropyl group from said substance to said benzene to form the corresponding alkylbenzene and toluene while said trimethylbenzene remains unreacted; separating said catalyst from the reaction mixture; and fractionating the reaction mixture into its components including toluene, said alkylbenzene and trimethylbenzene by fractional distillation.

2. The method according to claim 1, additionally comprising adding as a co-catalyst a member selected from the group consisting of hydrogen halides and compounds forming hydrogen halides during the reaction under the conditions prevailing therethrough.

3. The method according to claim 2, wherein the co-catalyst is an alkyl halide.

4. The process according to claim 1, wherein the ratio of weight of the aromatic $C_9$-hydrocarbons mixture:benzene is between 1:0.5 and 1:10.

5. The process according to claim 4, wherein the reaction temperature ranges from 0° to 150° C.

6. The process according to claim 5, wherein the reaction temperature ranges from 40° to 85° C.

7. The process according to claim 5, wherein the mean reaction time is from 10 to 100 minutes.

8. The method according to claim 2, wherein said Friedel-Crafts catalyst is aluminum chloride and said co-catalyst is hydrogen chloride.

9. The method according to claim 2, wherein said Friedel-Crafts catalyst is boron trifluoride and said co-catalyst is hydrogen fluoride.

References Cited

UNITED STATES PATENTS

| | | | |
|---|---|---|---|
| 2,385,524 | 9/1945 | Mattox | 260—672 X |
| 2,834,821 | 5/1958 | Bergsteinsson | 260—672 |
| 2,922,827 | 1/1960 | Saffer et al. | 260—674 |
| 2,995,611 | 8/1961 | Linn et al. | 260—671 |
| 3,031,513 | 4/1962 | Earhart et al. | 260—672 X |

DELBERT E. GANTZ, *Primary Examiner.*

C. R. DAVIS, *Assistant Examiner.*